US006582075B1

(12) United States Patent
Swab et al.

(10) Patent No.: US 6,582,075 B1
(45) Date of Patent: Jun. 24, 2003

(54) EYEGLASS TEMPLE ATTACHMENT MECHANISM

(75) Inventors: Gregg T. Swab, Tulsa, OK (US); Mikal Barry Greaves, Mountain View, CA (US)

(73) Assignee: QR Spex, Inc., Tulsa, OK (US)

( * ) Notice: Subject to any disclaimer, the term of this patent is extended or adjusted under 35 U.S.C. 154(b) by 0 days.

(21) Appl. No.: 09/846,028

(22) Filed: Oct. 18, 2001

(51) Int. Cl.7 ................................................ G02C 1/00
(52) U.S. Cl. ...................................... 351/158; 351/121
(58) Field of Search ............................... 351/158, 119, 351/121, 111, 153; 381/327

(56) References Cited

U.S. PATENT DOCUMENTS

| | | | |
|---|---|---|---|
| 2,794,085 A | * | 5/1957 | Angelis ........................ 351/158 |
| 3,104,290 A | | 9/1963 | Rosemond et al. |
| 3,119,903 A | | 1/1964 | Rosemond et al. |
| D201,050 S | | 5/1965 | Gieseking et al. |
| 3,227,836 A | | 1/1966 | Renwick, Sr. |
| 3,383,682 A | | 5/1968 | Stephens, Jr. |
| 3,762,804 A | | 10/1973 | Livas |
| 3,809,829 A | * | 5/1974 | Vignini et al. ............... 351/158 |
| 3,853,393 A | | 12/1974 | Fila et al. |
| 4,153,347 A | | 5/1979 | Myer |
| 4,254,451 A | | 3/1981 | Cochran, Jr. |
| 4,283,127 A | | 8/1981 | Rosenwinkel et al. |
| 4,488,792 A | | 12/1984 | Wagner |
| 4,564,272 A | | 1/1986 | Rinnooy Kan |
| 4,904,078 A | | 2/1990 | Gorike |
| 5,007,728 A | | 4/1991 | Magorien |
| 5,020,150 A | | 5/1991 | Shannon |
| 5,035,498 A | | 7/1991 | Bolle |
| 5,059,017 A | | 10/1991 | Bennato |
| 5,106,179 A | | 4/1992 | Kamaya et al. |
| 5,182,585 A | | 1/1993 | Stoner |
| 5,281,957 A | | 1/1994 | Schoolman |
| 5,327,178 A | | 7/1994 | McManigal |
| 5,359,370 A | | 10/1994 | Mugnier |
| 5,379,140 A | | 1/1995 | Michel et al. |
| 5,404,385 A | | 4/1995 | Ben-Haim |
| 5,418,581 A | | 5/1995 | Conway |
| 5,455,638 A | | 10/1995 | Kallman et al. |
| 5,539,561 A | | 7/1996 | Khalifa |
| 5,579,062 A | | 11/1996 | Sondrol |
| 5,594,511 A | | 1/1997 | Lin |
| 5,606,743 A | | 2/1997 | Vogt et al. |
| 5,652,637 A | | 7/1997 | Marini |
| 5,717,479 A | | 2/1998 | Rickards |
| 5,796,341 A | | 8/1998 | Stratiotis |
| 5,853,005 A | | 12/1998 | Scanlon |
| 5,892,564 A | | 4/1999 | Rahn |
| 5,936,701 A | | 8/1999 | Sartor |
| 5,988,812 A | | 11/1999 | Wingate |
| 6,010,216 A | | 1/2000 | Jesiek |
| 6,012,812 A | | 1/2000 | Rickards |
| 6,091,546 A | | 7/2000 | Spitzer |
| 6,091,832 A | | 7/2000 | Shurman et al. |
| 6,163,281 A | | 12/2000 | Torch |
| 6,409,338 B1 | * | 6/2002 | Jewell ........................ 351/158 |

FOREIGN PATENT DOCUMENTS

DE  36 27 117  * 2/1988  ................. 381/312

* cited by examiner

Primary Examiner—Huy Mai
(74) Attorney, Agent, or Firm—Joel E. Lutzker; Anna Vishev; Schulte Roth & Zabel LLP

(57) ABSTRACT

An eyeglass assembly having a lens frame; a temple piece; an electrical insert projecting from either the lens frame or the temple piece; and a receiver provided in or on the other of the lens frame or temple piece. The electrical insert is removably insertable into the receiver for both releasably attaching the temple piece to the lens frame and for establishing an electrical connection therebetween.

22 Claims, 6 Drawing Sheets

EYEGLASS TEMPLE ATTACHMENT MECHANISM

FIELD OF THE INVENTION

In one aspect, the present invention relates to eyeglasses having removable temple pieces. In another aspect, the present invention relates to eyeglasses having substantially invisible, quick-connect attachment structures for connecting and removing temple pieces. In yet another aspect, the present invention relates to eyeglasses having temple attachments capable of providing permanent or releasable electrical connections or circuits between the temple piece(s) and the eyeglass frame.

BACKGROUND OF THE INVENTION

A need presently exists for eyeglasses having temple pieces which can be quickly and easily removed and reconnected. Such eyeglasses will preferably allow the user to quickly and conveniently (a) interchange temple pieces of different fashion, look, and/or style, (b) exchange fashion wear temple pieces with more durable, sports-type or safety-type temple pieces (with secure side shields, if desired), and (c) attach temple pieces of different size and/or shape for growing children or for different users. Moreover, the releasable attachment mechanism will preferably be both secure and easily releasable.

A need also exists for eyeglass temple attachment mechanisms capable of providing or forming electrical connections or circuits between one or both of the temple pieces and the eyeglass frame. A need particularly exists for attachment mechanisms of this type which will also allow the temple pieces to be quickly and easily removed, replaced, and securely reattached.

Although certain types of removable temple structures have been suggested heretofore, these prior systems have not met the needs mentioned above and have typically had numerous other significant shortcomings. U.S. Pat. No. 5,594,511, for example, discloses a rather complicated, two-part temple piece requiring the installation of a visible intermediate "connector" of significant size. U.S. Pat. No. 5,418,581 discloses temple pieces having visible hook structures on the ends thereof which must be attached to permanent, visible T-shaped hinges molded onto the sides of the lens frame. U.S. Pat. No. 5,652,637 discloses a three-piece attachment system consisting of a visible "female member" molded onto the side of the lens frame, a visible intermediate "male member" which snaps into the female member, and an outer ear piece which is attached by a hinge pin to the outer end of the "male member." U.S. Pat. No. 4,488,792 discloses a two-piece temple structure consisting of a visible forward segment permanently attached to the side of the lens frame and a rearward ear piece which is hinged to the forward segment by means of a spring arm visibly extending along the top of the ear piece. U.S. Pat. No. 5,007,728 discloses a two-piece temple structure consisting of a visible front piece hinged to the side of the lens frame and an ear piece which locks on to the front piece by means of a visible locking structure.

Thus, the systems suggested heretofore typically include visible connecting structures and/or visible intermediate connecting pieces which (a) significantly and undesirably affect the look and operation of the eyeglass system, (b) allow only the rearward ear portion of the temple piece to be truly interchangeable, (c) do not provide both easy installation and secure attachment, and/or (d) do not allow simple finger operation. Moreover, these systems have not been capable of providing or forming releasable electrical connections or circuits between the temple pieces and the eyeglass frame.

SUMMARY OF THE INVENTION

The present invention satisfies the needs and alleviates the problems discussed hereinabove. The present invention provides a particularly desirable system for releasably attaching temple pieces to lens frames. Thus, the user can quickly and conveniently interchange temple pieces for any desired use, look, or style. Moreover, if desired, the inventive system can be used to provide releasable electrical connections between the temple piece(s) and lens frame such that an electrical circuit extending through the lens frame and into one or both of the temple pieces can be established. This allows the inventive eye wear to be used for generally any type of wireless technology. Examples of such technologies include, but are not limited to: AM and FM radios, hands-free mobile phones, digital cameras, child distance alarms, walkie-talkies, GPS guide links, heart pulse monitors, etc.

In one aspect, the present invention provides eyeglasses comprising: a lens frame; a temple piece; and an electrical insert projecting from one of the lens frame and the temple piece with the other of the lens frame and the temple piece having a receiver. The electrical insert is removably insertable into the receiver such that the insertion of the electrical insert into the receiver will both releasably attach the temple piece to the lens frame and will establish an electrical connection between the lens frame and the temple piece.

In another aspect, the present invention provides eyeglasses comprising: a lens frame; a temple piece; a hinge pivotably connecting the temple piece to the lens frame; and an electrical insert projecting from the hinge. Additionally, one of the lens frame and the temple piece has a receiver wherein the electrical insert is received such that an electrical connection is formed between the lens frame and the temple piece.

In yet another aspect, the present invention provides eyeglasses comprising: a lens frame; a temple piece; and a phone plug projecting from one of the lens frame and the temple piece with the other of the lens frame and the temple piece having a receiver. The phone plug is removably insertable into the receiver such that the insertion of the phone plug into the receiver will releasably attach the temple piece to the lens frame.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

Figure 1:
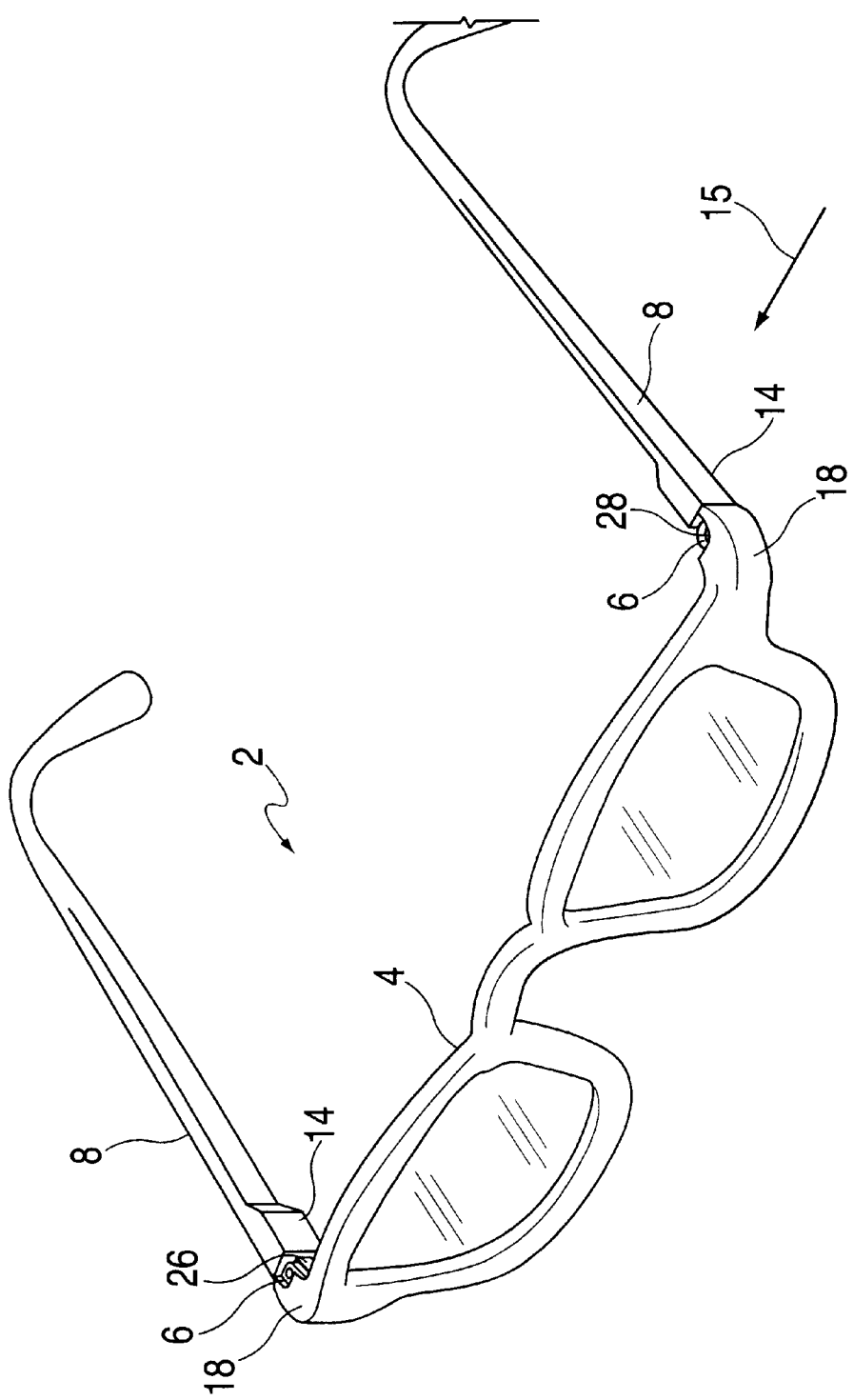
FIG. 1 provides a perspective view of an embodiment 2 of a pair of eyeglasses provided by the present invention.

An embodiment 2 of a pair of eyeglasses provided by the present invention is depicted in FIGS. 1–5. The eyeglasses 2 preferably comprise: (a) a lense frame 4 having temple hinges 6 provided at each of the outer ends thereof and (b) a pair of temple pieces (i.e., side or ear pieces) 8 releasably and removably attachable to the lens frame 4. The releasable attachment of each of temple pieces 8 to lense frame 4 is preferably accomplished using a system comprising an electrical insert 10 pivotably extending from hinge 6 and a receiver 12 provided at the forward end 14 of temple piece 8. Receiver 12 releasably and removably receives the electrical insert 10.

The receiver 12 will preferably be positioned, and the electrical insert 10 will preferably be receivable therein, in a manner such that the attachment system will be at least substantially hidden from outside view. As used herein and in the claims, the phrase "substantially hidden from outside view" means that, when the temple piece 8 is attached to lens frame 4 and the assembled eyeglasses are placed in normal position on a user's head, the inventive attachment will, when viewed laterally from the direction arrow 15 depicted in FIG. 1, either (a) be essentially invisible or (b) appear to be only a conventional temple hinge. This result can be accomplished, for example, by fully incorporating the receiver 12 in the interior of the forward end portion 14 of the temple piece 8 or by attaching the receiver 12 to the interior surface 16 of temple piece 8. When desired, the entire temple hinge 6 can be concealed from outside view using, for example, an outer covering structure 18 which either extends rearwardly from the outside of lens frame 4 or forwardly from the forward end 14 of the temple piece 8.

When the electrical inserts 10 projecting from lens frame 4 are received in receivers 12, each of the temple pieces 8 is releasably and electrically connected to frame 4 such that an electrical circuit 20 extending through frame 4 and into each of temple pieces 8 is established. As will be understood by those skilled in the art, some or all of the components of the electrical circuit and system 20, including any chips, conducting wires, etc., may be co-molded into the temple pieces 8 and frame 4 and/or may be assembled into piece parts which make up the temples and frame. In addition, the electrical circuit 20 could include finger operated switches for turning the electrical system on and off, could include a switch or contact pads in at least one of the temple hinges 6 whereby the electrical circuit 20 is opened and closed by pivoting the temple piece(s) 8 with respect to lens frame 4, or could be automatically activated whenever the temple piece(s) 8 is/are connected to lense frame 4.

It will also be understood by those skilled in the art that embodiment 2 of the inventive eyeglass system can be readily changed, modified, and/or adapted in numerous ways to accommodate an unlimited range of uses. For example, (a) an electrical insert 10 could be used to attach only one rather than both of temple pieces 8; (b) the electrical insert(s) 10 could be used solely for releasably attaching the temple piece(s) 8 rather than also establishing an electrical connection; (c) the parts of the inventive eyeglasses 2 could be reversed such that, for example, temple hinge(s) 6 and/or electrical inserts 10 could project from temple piece(s) 8; (d) the receiver(s) 12 could be provided on or in the outer end portions of lense frame 4; (e) electrical insert(s) 10 could alternatively be permanently received in receiver(s) 12 such that the temple piece(s) 8 is/are electrically connected to lense frame 4 but is/are not releasable; (f) the temple hinges 6 could be excluded such that electrical inserts 10 otherwise project from temple pieces 8 or lense frame 4 for non-pivoting attachment or for some other type of alternative attachment; and/or (g) receivers 12 rather than inserts 10 could be made to project from hinges 6.

Electrical inserts 10 can generally be any type of inserts capable of releasably and securely retaining the temple pieces 8 on lense frame 4. Examples of such inserts include, but are not limited to: phone plugs, coaxial-type plugs, modular plugs, circular plugs, and the like. Receivers 12, on the other hand, can generally be any type of receivers capable of receiving the electrical inserts 10 such that temple pieces 8 are releasably and securely retained on lense frame 4. Examples of suitable receivers include, but are not limited to: phone jacks, coaxial-type jacks, modular jacks, circular jacks or receptacles, and the like. The electrical inserts 10 and receivers 12 will preferably be of a type which can be installed in or on the lense frame 4 and temple pieces 8 such that, when inventive eyeglasses 2 are positioned on a user's head, the electrical inserts 10 and receivers 12 will be at least substantially hidden from outside view.

It will further be understood by those skilled in the art that, if the electrical inserts 10 and receivers 12 are being used solely to establish a releasable connection rather than to form any type of electrical circuit, only the normal mechanical connecting features of the inserts 10 and receivers 12 must be present. In other words, if the inserts 10 and receivers 12 are not being used to establish any type of electrical connection, none of the features or elements of the inserts 10 or receivers 12 need be electrically conducting.

Figure 2:
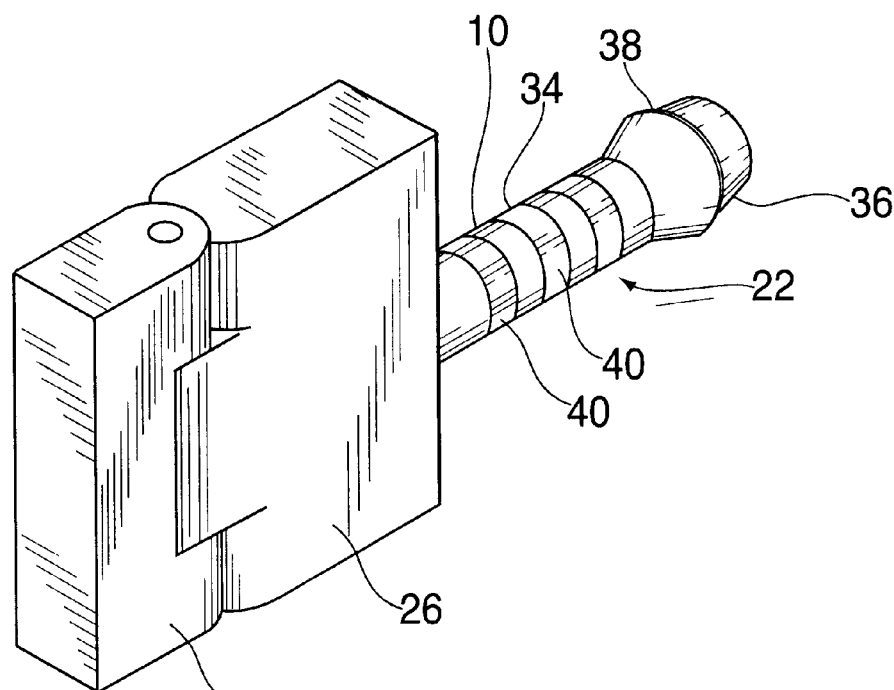
FIG. 2 provides a perspective view of a phone plug 22 used in eyeglasses 2.
Figure 3:
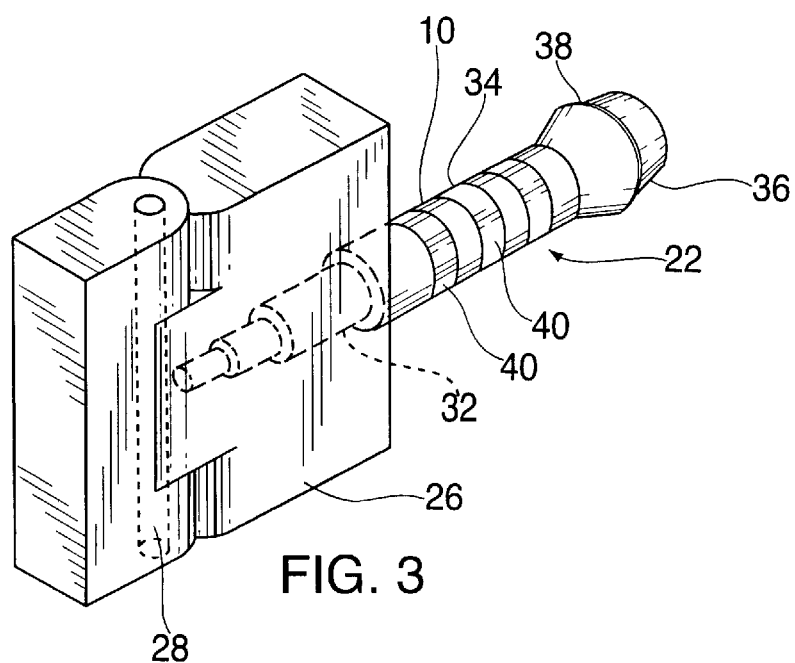
FIG. 3 provides a cutaway perspective view of phone plug 22.
Figure 10:
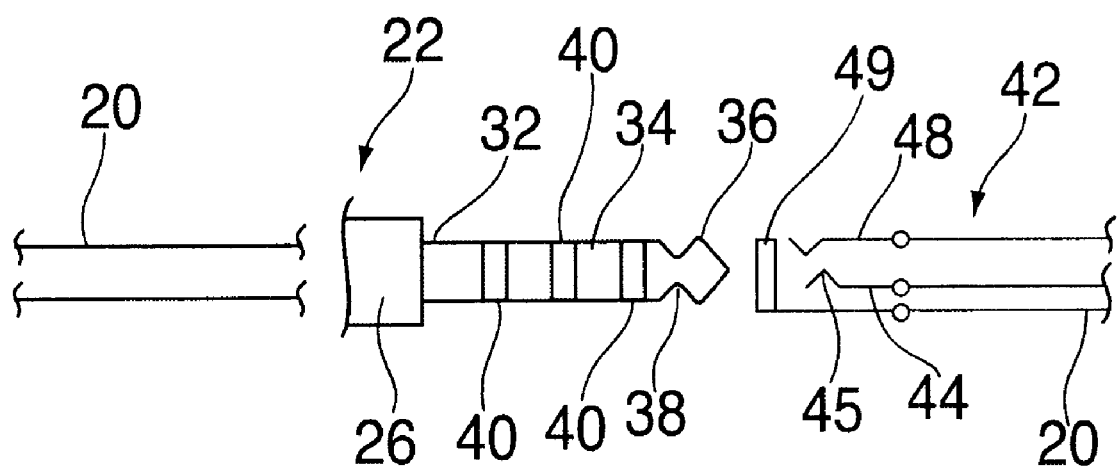
FIG. 10 schematically illustrates phone plug 22, the interior of phone jack 42 and an electrical circuit 20 formed by inserting plug 22 into jack 42. Electrical circuit 20 can extend through the eyeglass frame and into one or both temple pieces.

A phone plug 22 of a type particularly well suited for use in the inventive eyeglasses 2 is depicted in FIGS. 2, 3, and 10. Phone plug 22 can be of common construction and is sized for use in the inventive eyeglasses. Phone plug 22 preferably projects from a pivoting hinge element 26. A pin 28 extends through hinge element 26 and through the other corresponding elements of temple hinge 6.

The phone plug 22 preferably comprises: a base end segment 32 which is received and is preferably permanently retained in the pivoting hinge element 26; an elongate external pin 34 projecting from hinge element 26; a tapered tip 36 provided on the forward end of plug pin 34; and a groove or recess 38 defined by the transition from pin 34 to tapered tip 36.

As will be understood by those skilled in the art, if phone plug 22 is to be used for establishing an electrical as well as a mechanical connection between the frame and temple pieces, the tapered tip 36 of plug pin 34 will preferably be electrically conducting. Further, each of the internal base 32 and external pin 34 segments of the phone plug will preferably include one or more electrically conducting sleeves or rings 40.

A phone jack 42 of a type particularly well suited for use in the present invention is depicted in FIGS. 5, 7–9, and 10. Phone jack 42 can be of common construction and is sized for use in inventive eyeglass system 2. Phone jack 42 preferably includes at least one spring clip 44 having a V-shaped or rounded contact end 45 which snaps into the recess 38 formed at the base of the tapered tip 36 of phone plug 22 and thus releasably retains the phone plug 22 in the phone jack 42. The contact 45 can also provide an electrical connection with tapered tip 36. Phone jack 42 can also include additional spring clips 48 corresponding to the number of electrically conducting exterior sleeves 40, if any, provided around the external pin portion 34 of phone plug 22. Base 32, of plug 22 contacts ring 49 of jack 42 when plug 22 and jack 42 are mated.

Figure 4:
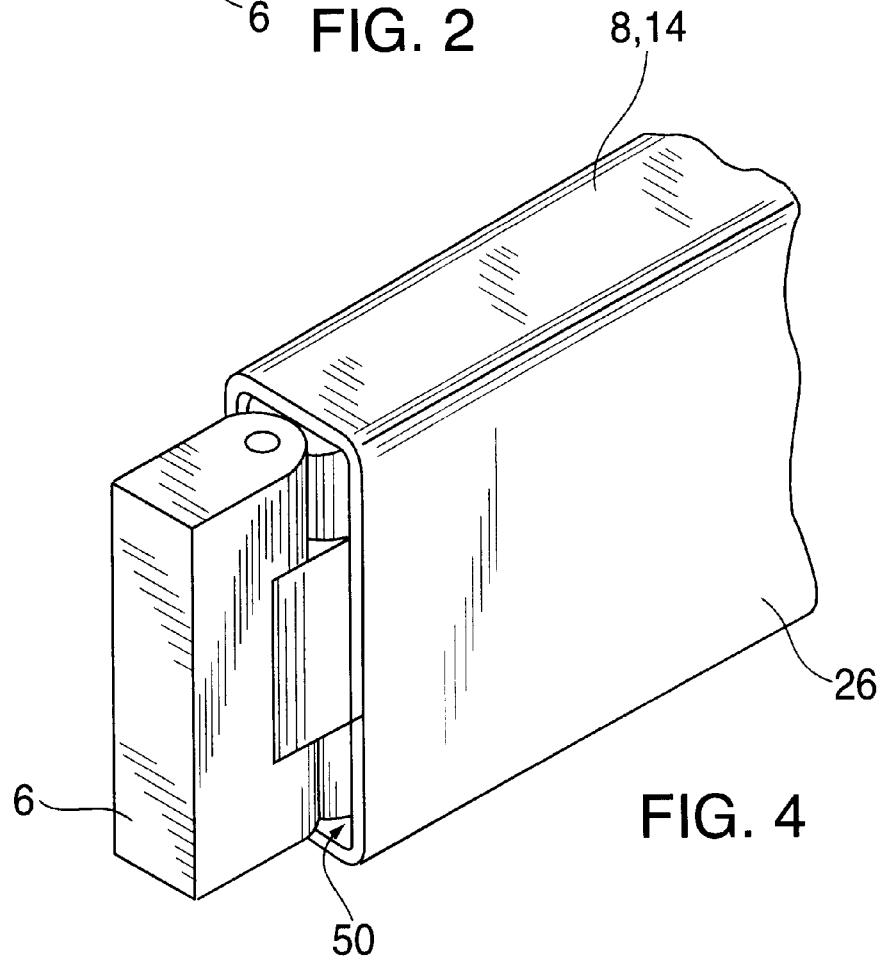
FIG. 4 provides a perspective view of a hinge attachment used in eyeglasses 2.
Figure 5:
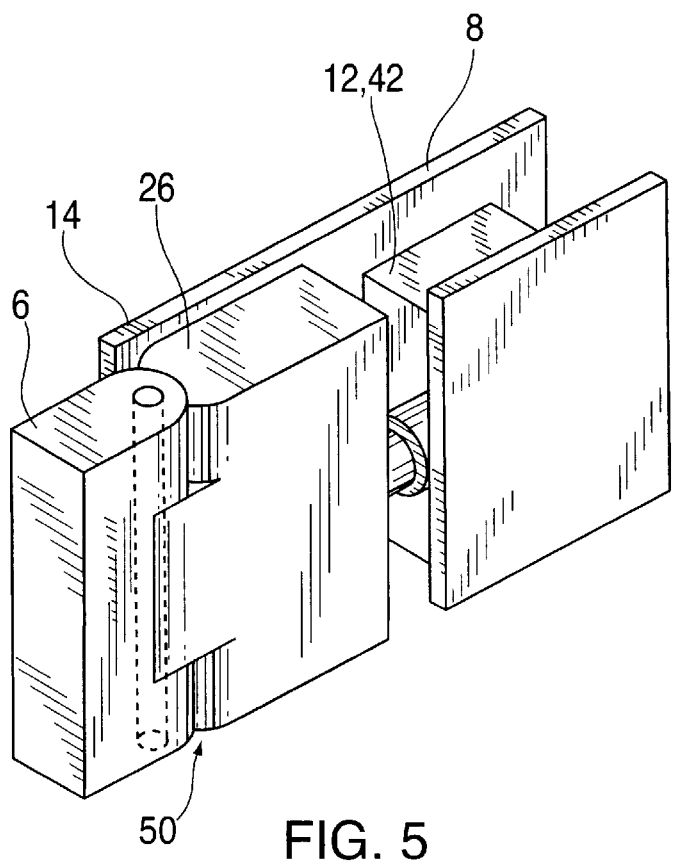
FIG. 5 provides a cutaway perspective view of the hinge attachment.
Figure 6:
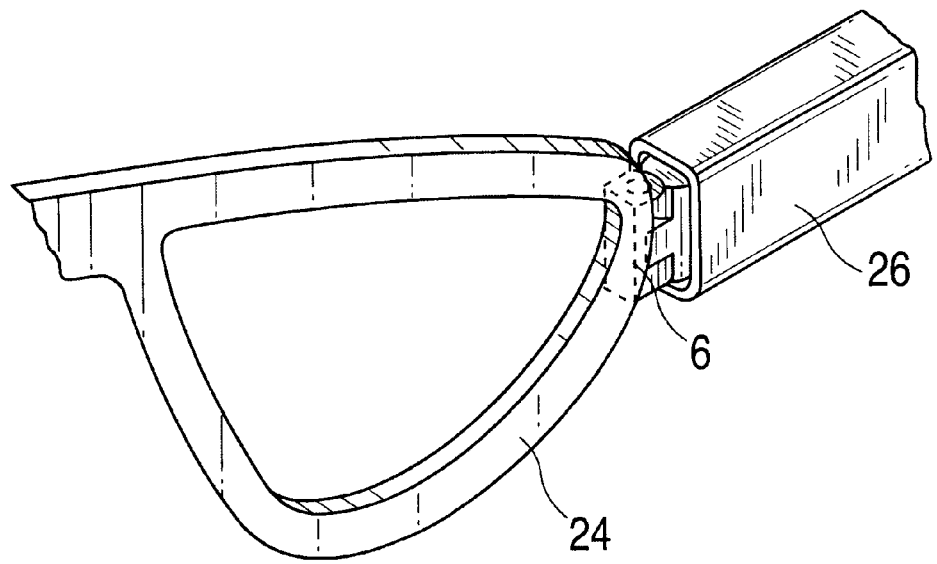
FIG. 6 provides an additional view of the hinge attachment on a pair of eyeglasses.
Figure 7:
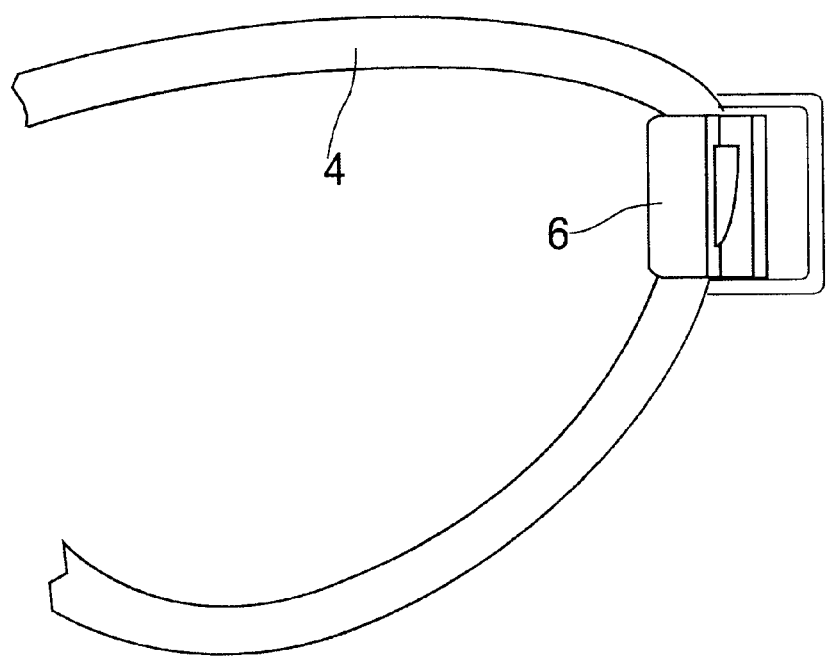
FIG. 7 provides a cutaway end view of phone plug 22 and a phone jack 42 used in the present invention.
Figure 8:
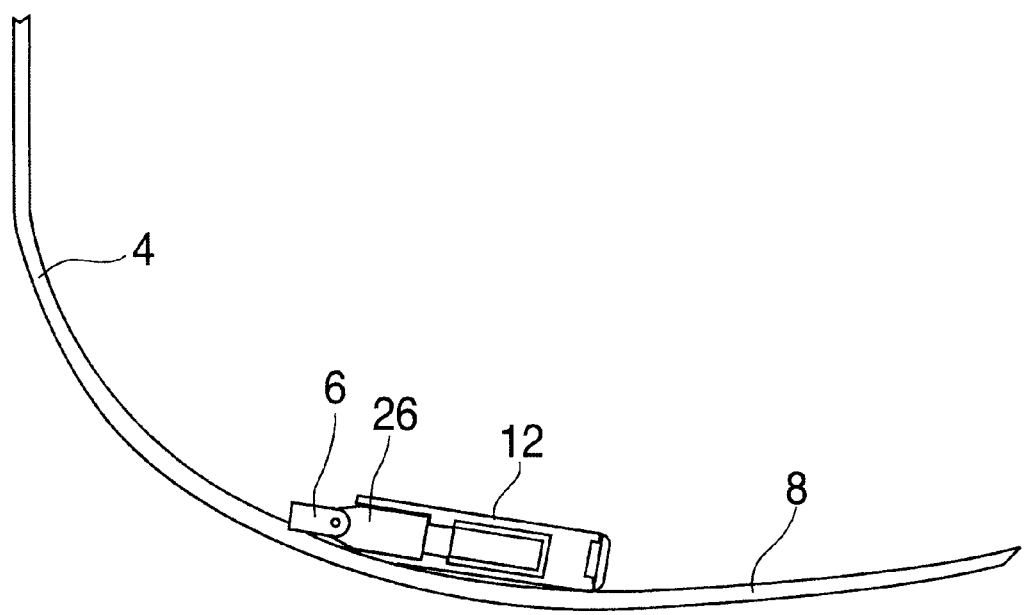
FIG. 8 provides a cutaway top view of phone plug 22 and phone jack 42.
Figure 9:
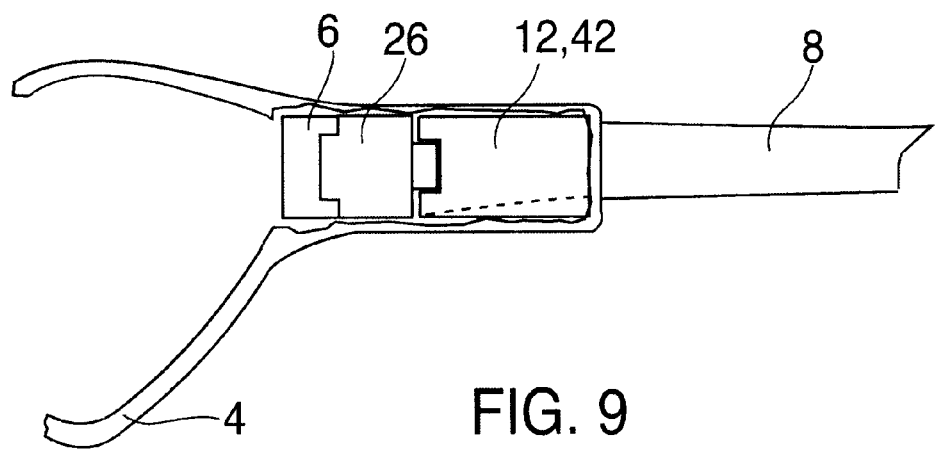
FIG. 9 provides a cutaway side view of phone plug 22 and phone jack 42.

As shown in FIGS. 1, 4, and 5, phone jack 42 is preferably recessed within a cavity 50 provided in the forward end of temple piece 8, or in some other housing structure or container 52, such that, when phone plug 22 is received in phone jack 42, at least a portion of hinge element 26 will be received in the forward portion of cavity 50. The exterior of hinge element 26 and the interior of the forward end of cavity 50 will preferably be of rectangular shape or will have other non-cylindrical shapes or features (e.g., keys or splines) which will assist in preventing the temple pieces 8 from rotating with respect to lense frame 4.

Phone plug 22 and phone jack 42 are thus highly effective for securely but releasably retaining temple pieces 8 on lense frame 4. The user can readily remove the temple pieces 8 from lense frame 4 by hand by simply applying a firm, straight pulling force thereto.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. Eyeglasses comprising:
   a lens frame;
   a temple piece; and
   an electrical insert projecting from one of said lens frame and said temple piece with the other of said lens frame and said temple piece having a receiver,
   wherein said electrical insert is removably insertable into said receiver and securable within said receiver without a hinge pin, such that the insertion of said electrical insert into said receiver will both releasably attach said temple piece to said lens frame and will establish an electrical connection between said lens frame and said temple piece.

2. The eyeglasses of claim 1 wherein said one of said lens frame and said temple piece includes a hinge and said electrical insert projects from said hinge.

3. The eyeglasses of claim 1 wherein said electrical insert is a phone plug.

4. The eyeglasses of claim 3 wherein said receiver is a phone jack.

5. The eyeglasses of claim 1 wherein said temple piece has a forward end and said receiver is provided at said forward end.

6. The eyeglasses of claim 5 wherein, when said electrical insert is received in said receiver and said eyeglasses are positioned on a user's head, said electrical insert and said receiver will be at least substantially hidden from outside view.

7. The eyeglasses of claim 1 further comprising:
   a second temple piece, and
   a second electrical insert project from one of said lens frame and said second temple piece with the other of said lens frame and said second temple piece having a second receiver,
   wherein said second electrical insert is removably insertable into said second receiver and securable within said second receiver without a hinge pin, such that the insertion of said second electrical insert into said second receiver will both releasably attach said second temple piece to said lens frame and will establish an electrical connection between said lens frame and said second temple piece.

8. The eyeglasses of claim 7 wherein, when said electrical inserts are received in said receivers, an electrical circuit extending through said lens frame and into each of said temple pieces will be formed.

9. Eyeglasses comprising:
   a lens frame;
   a temple piece;
   a hinge pivotably connecting said temple piece to said lens frame; and
   an electrical insert projecting from said hinge;
   one of said lens frame and said temple piece having a receiver wherein said electrical insert is secured within said receiver without a hinge pin and is received by said receiver such that an electrical connection is formed between said lens frame and said temple piece.

10. The eyeglasses of claim 9 wherein said electrical insert is removably received in said receiver such that said electrical insert releasably attaches said temple piece to said lens frame.

11. The eyeglasses of claim 9 wherein said electrical insert is a phone plug.

12. The eyeglasses of claim 11 wherein said receiver is a phone jack.

13. The eyeglasses of claim 9 wherein said temple piece has a forward end and said receiver is provided at said forward end.

14. The eyeglasses of claim 13 wherein, when said electrical insert is received in said receiver and said eyeglasses are positioned on a user's head, said electrical insert and said receiver are at least substantially hidden from outside view.

15. The eyeglasses of claim 9 wherein said electrical insert attaches said temple piece to said lens frame.

16. The eyeglasses of claim 9 further comprising:
   a second temple piece;
   a second hinge pivotally connecting said second temple piece to said lens frame; and
   a second electrical insert projecting from said second hinge,
   one of said lens frame and said second temple piece having a second receiver wherein said second electrical insert is secured within said second receiver without a hinge pin and is received by said second receiver such that an electrical connection is formed between said lens frame and said second temple piece.

17. The eyeglasses of claim 16 wherein, when said electrical inserts are received in said receivers, an electrical circuit extending through said lens frame and into each of said temple pieces is provided.

18. Eyeglasses comprising:
   a lens frame;
   a temple piece; and
   a phone plug projecting from one of said lens frame and said temple piece with the other of said lens frame and said temple piece having a receiver, wherein said phone plug is removably insertable into said receiver such that the insertion of said phone plug into said receiver will releasably attach said temple piece to said lens frame.

19. The eyeglasses of claim 18 wherein said one of said lens frame and said temple piece includes a hinge and said phone plug projects from said hinge.

20. The eyeglasses of claim 18 wherein said receiver is a phone jack.

21. The eyeglasses of claim 18 wherein said temple piece has a forward end and said receiver is provided at said forward end.

22. The eyeglasses of claim 21 wherein, when said phone plug is received in said receiver and said eyeglasses are positioned on a user's head, said phone plug and said receiver will be at least substantially hidden from outside view.

\* \* \* \* \*